US008769271B1

(12) United States Patent  
Osmond et al.

(10) Patent No.: US 8,769,271 B1  
(45) Date of Patent: *Jul. 1, 2014

(54) IDENTIFYING AND ENFORCING STRICT FILE CONFIDENTIALITY IN THE PRESENCE OF SYSTEM AND STORAGE ADMINISTRATORS IN A NAS SYSTEM

(75) Inventors: Roger F Osmond, Littleton, MA (US); Gil Goren, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,017

(22) Filed: Apr. 10, 2012

Related U.S. Application Data

(63) Continuation of application No. 11/426,645, filed on Jun. 27, 2006, now Pat. No. 8,176,319.

(51) Int. Cl.
*H04L 29/06* (2006.01)

(52) U.S. Cl.
USPC ......... 713/165; 726/2; 726/3; 726/26; 726/28

(58) Field of Classification Search
USPC .............................................. 713/165
See application file for complete search history.

(56) References Cited

U.S. PATENT DOCUMENTS

| | | | |
|---|---|---|---|
| 5,940,507 A | 8/1999 | Cane et al. | |
| 7,406,596 B2 * | 7/2008 | Tararukhina et al. | 713/165 |
| 2001/0047421 A1 * | 11/2001 | Sridhar et al. | 709/230 |
| 2002/0038296 A1 * | 3/2002 | Margolus et al. | 707/1 |
| 2002/0091975 A1 | 7/2002 | Redlich et al. | |
| 2002/0166053 A1 | 11/2002 | Wilson | |
| 2003/0021417 A1 | 1/2003 | Vasic et al. | |
| 2003/0056095 A1 | 3/2003 | Elliot et al. | |
| 2003/0105830 A1 | 6/2003 | Pham et al. | |
| 2003/0126434 A1 | 7/2003 | Lim et al. | |
| 2004/0010699 A1 | 1/2004 | Shao et al. | |
| 2004/0054893 A1 | 3/2004 | Ellis | |
| 2004/0151308 A1 | 8/2004 | Kacker et al. | |
| 2004/0153642 A1 | 8/2004 | Plotkin et al. | |
| 2004/0221163 A1 * | 11/2004 | Jorgensen et al. | 713/182 |
| 2004/0255137 A1 * | 12/2004 | Ying | 713/193 |
| 2005/0078822 A1 | 4/2005 | Shavit et al. | |
| 2005/0144468 A1 * | 6/2005 | Northcutt et al. | 713/189 |
| 2005/0262573 A1 | 11/2005 | Bo et al. | |
| 2005/0268114 A1 | 12/2005 | Thibadeau | |
| 2006/0015945 A1 | 1/2006 | Fields | |

OTHER PUBLICATIONS

Zhu et al., Research on Data Security of the Storage Network, Jun. 2006, Proceedings of the 2006 International Conference on Communications, Circuits and Systems, vol. 3, pp. 1596-1601.*

* cited by examiner

*Primary Examiner* — Mahfuzur Rahman
*Assistant Examiner* — Kenneth Chang
(74) *Attorney, Agent, or Firm* — Krishnendu Gupta; Joseph D'Angelo

(57) ABSTRACT

A data storage architecture for networked access by clients includes a file server capable of communication with the clients via the network, physical storage organized as a plurality of logical volumes, and an encryption device in communication with both the file server and the physical storage.

26 Claims, 5 Drawing Sheets

SIMPLIFIED LOGIC FLOW IN SERVER

| BIT BYTE | 7 | 6 | 5 | 4 | 3 | 2 | 1 | 0 |
|---|---|---|---|---|---|---|---|---|
| 0 | OPERATION CODE = 28h ||||||||
| 1 | LUN ||| DPO | FUA | RESERVED || RelAclr |
| 2 | Msb ||||||||
| 3 | LBA ||||||||
| 4 | ||||||||
| 5 | Lsb ||||||||
| 6 | RESERVED ||||||||
| 7 | Msb TRANSFER LENGTH |||||||  |
| 8 | Lsb ||||||||
| 9 | CONTROL ||||||||

400

SCSI 10 BYTE READ COMMAND (28h)

FIG. 4

| BIT BYTE | 7 | 6 | 5 | 4 | 3 | 2 | 1 | 0 |
|---|---|---|---|---|---|---|---|---|
| 0 | OPERATION CODE = 3Eh ||||||||
| 1 | LUN ||| RESERVED ||| CORRCT | RelAclr |
| 2 | Msb — LBA ||||||||
| 3 |  ||||||||
| 4 |  ||||||||
| 5 | Lsb ||||||||
| 6 | RESERVED ||||||||
| 7 | Msb — TRANSFER LENGTH ||||||||
| 8 | Lsb ||||||||
| 9 | CONTROL ||||||||

SCSI 10 BYTE READ LONG COMMAND (3Eh)

FIG. 5

IDENTIFYING AND ENFORCING STRICT FILE CONFIDENTIALITY IN THE PRESENCE OF SYSTEM AND STORAGE ADMINISTRATORS IN A NAS SYSTEM

RELATED APPLICATIONS

This application is a continuation of U.S. patent application Ser. No. 11/426,645, filed on Jun. 27, 2006 now U.S. Pat. No. 8,176,319 and entitled "Identifying and Enforcing Strict File Confidentiality in the Presence of System and Storage Administrators in a NAS System", which is hereby incorporated in its entirety by this reference.

FIELD OF THE INVENTION

This invention relates generally to the field of data storage, and more particularly to encrypted data storage.

BACKGROUND OF THE INVENTION

Protection of confidential information may be more difficult than ever before because of the proliferation of networked computing devices. Comprehensive protection of information stored in computer-readable form should include identity management, authorization/authentication, data integrity assurance, proper logging/auditing, i.e., to ensure chain of custody, and a guarantee of confidentiality. Data encryption is part of most protection regimes. Data encryption can be employed for data in-flight and for data at rest. Data in-flight encryption is especially valuable for data that leaves the relatively safer and more secure "behind the firewall" environment. Data in-flight has received significant attention, and there are many commercially available products. Data at rest has received less attention. Recently, there have been some highly publicized incidents in which data at-rest in the form of backups on tapes have been lost or otherwise compromised. This publicity has lead to increased demand for devices that can encrypt data at rest on tape. However, the threat to data at rest may actually be greater when it is stored on disk than on tape. This is because the on-disk data is more current, and therefore more valuable. Further, the data on-disk is more likely to be accessible via a network, and a greater number of individuals are likely to have access to the data, whether rightfully or not.

One vulnerability of known encryption schemes is the "super user problem." In order to maintain a network and storage system, network administrators and storage administrators are typically provided with unrestricted access to files. Further complicating matters, file servers typically provide a means by which remote users with administrator privileges, a.k.a. "super users," are granted the equivalent of local administrator access. Since the remote administrator is granted local administrator privileges, that remote administrator can have full and unencumbered access to metadata and data, regardless of defined file or directory ownership and permissions. UNIX and Linux systems have a mechanism by which to treat remote "root" users as if they were local. This capability is also common to dedicated NAS servers. This mechanism also makes it possible for administrators to subvert or circumvent permissions and other access controls. Such access is a significant compromise to confidentiality. However, it is also necessary for the super-users to perform legitimate administrative functions on networked resources, perhaps remotely, so the super user cannot simply be eliminated.

SUMMARY OF THE INVENTION

In accordance with one embodiment of the invention, data storage apparatus available to at least one requestor via a network, comprises: a file server capable of communication with the client via the network; physical storage; and an encryption device in communication with both the file server and the physical storage; wherein first and second logical paths are established between the file server and the physical storage, by way of the encryption device, the first path being employed for a first type of requestor and the second path being employed for a second type of requestor, and wherein the encryption device is operative to provide decrypted data to the file server via the first path, and to provide encrypted data to the file server via the second path.

In accordance with another embodiment of the invention, a method for managing data storage available to at least one requestor via a network, comprises the steps of: in response to a request from a first type of requestor, providing decrypted data to the requestor via a first logical path; and in response to a request from a second type of requestor, providing encrypted data to the requestor via a second logical path.

One advantage of the invention is preserving data confidentiality with regard to super users while retaining the capability to perform legitimate administrative functions. In particular, by providing an administrator with access to unencrypted metadata and only encrypted data for a confidential record, most legitimate administrative functions can be performed without compromising the confidentiality of the data. Another advantage is a file server that supports encryption without need for knowledge of the encryption keys, and without foregoing services typically restricted by use of encryption.

BRIEF DESCRIPTION OF THE FIGURES

FIGS. 4 and 5 illustrate SCSI command description blocks for implementing dual path Write and Read operations.

DETAILED DESCRIPTION

Figure 1:
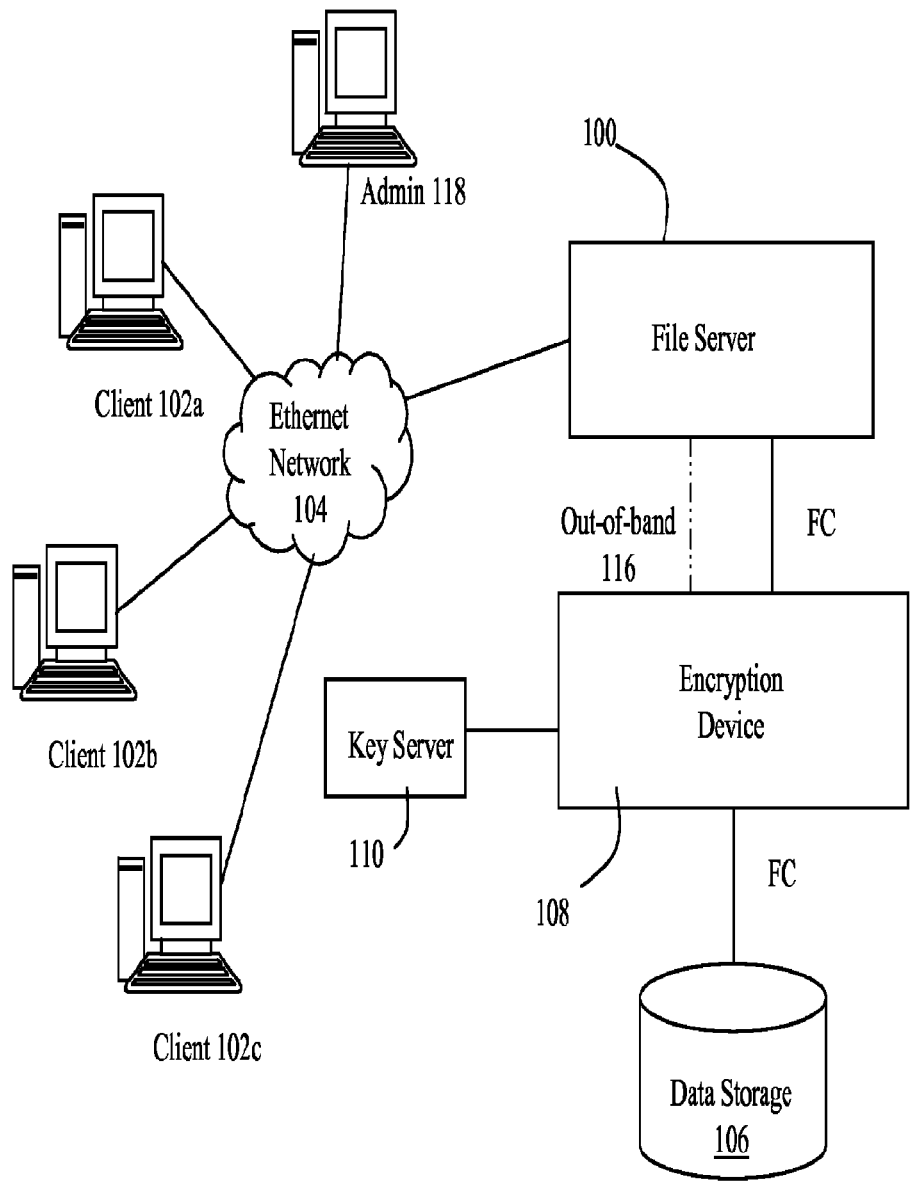
FIG. 1 illustrates a storage architecture operable to use block maps to enable intelligent encryption.

Referring to FIG. 1, a storage architecture includes a file server (100) in communication with clients (102a, 102b, 102c) via a local area network (104) using a first protocol such as Ethernet. In the case where the architecture is isolated from wider area networks by a firewall, data transmitted between the file server and clients may be "in the clear," i.e., not encrypted. The file server (100) is also in communication with, and possibly embedded with, a RAID group storage array (106) via an encryption device (108) using a second protocol such as Fibre Channel ("FC"). The encryption device (108) is in communication with a key server (110) which operates to provide the encryption keys. The encryption device utilizes the encryption keys to selectively encrypt data being moved into storage in the data storage (106), and also utilizes the encryption keys to selectively decrypt data being delivered from the data storage (106). Operation of the storage architecture may be in accordance with co-pending U.S. patent application Ser. No. 11/426,641, entitled ACHIEVING STRONG CORRELATION BETWEEN HIGHER LEVEL SEMANTIC UNITS AND LOWER LEVEL COMPONENTS IN A DATA STORAGE SYSTEM, filed contemporaneously with this application, by the same inventors, which is incorporated by reference. Various enhancements to the storage architecture may be implemented to facilitate ownership enforcement to protect against, among other things, the super user problem. One aspect of a solution to the super user problem is prohibiting remote admins from gaining super user privilege for confidential NAS data. The file server can be configured to enforce this behavior at a level of granularity matching the unit of protection (e.g., file system, file, partial file), and do so regardless of any export options.

Figure 2:
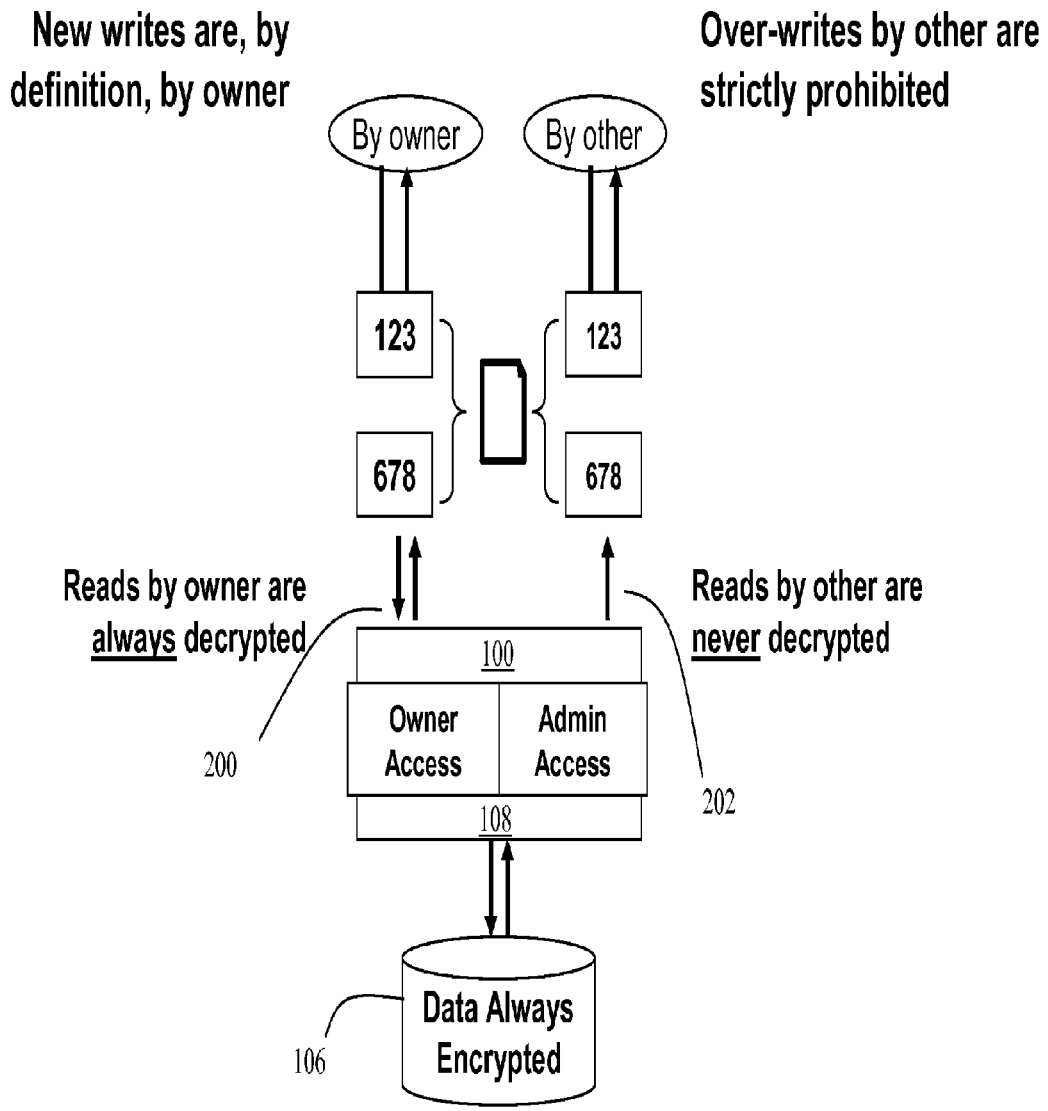
FIG. 2 illustrates dual path Write and Read operations.

Referring to FIG. 2, in one embodiment of the invention two alternate paths (200, 202) are provided for I/O operations associated with the data storage (106). Confidential data in data storage is always encrypted. One I/O path (200) is reserved for the file owner, or group of owners, where ownership in this sense equates to a normal user with appropriate permissions, and excludes users acting with special privileges resulting from a super-user mechanism. Data retrieved via the file owner path (200) is always decrypted. The second path (202) is available to "others" than the owner, such as super-users. Data retrieved via the second path (202) is never decrypted. The actual data on disk is the same regardless of path, the only difference is in the decryption policy. Write accesses by others are explicitly denied in all cases. Overwrites by others constitute a breach of security with respect to chain of custody and data integrity, and are as such denied. When a read-by-other occurs, the file server signals an indication to the encryption device. This signaling may be done in-band because of problems such as high latency and race conditions that might be encountered with signaling out-of-band. The encryption device is operative in response to the signaling of a read-by-other to provide the data in encrypted form. Naturally, the others authorized to receive the encrypted data may also be qualified in some way.

Figure 3:
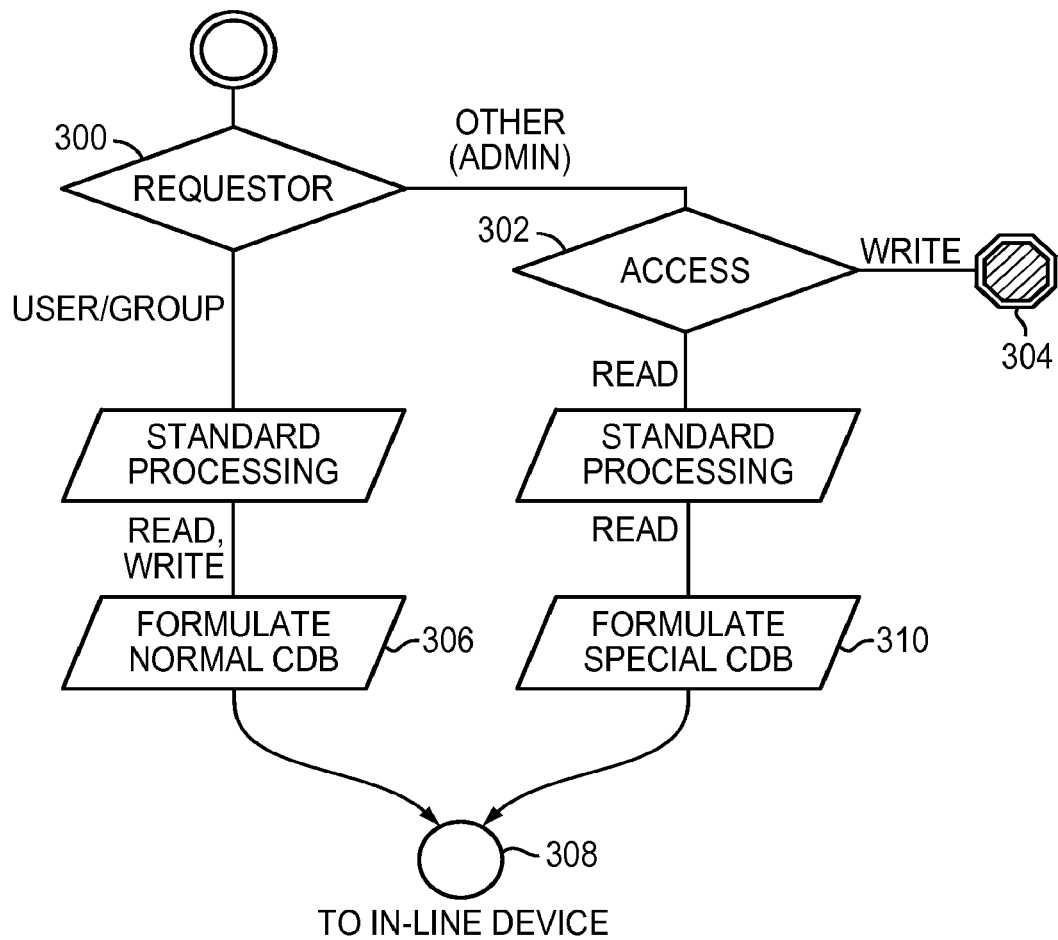
FIG. 3 is a flow diagram of dual path Write and Read operations.

FIGS. 3-5 illustrate a technique for implementing the alternate paths (200, 202). In an initial step (300), the I/O requestor is identified as being either an owner or other. If the requestor is the owner, a command description block ("CDB") such as that illustrated in FIG. 4 is generated as indicated by step (306). The OP Code field (400) is employed to designate whether the request is a Read or Write by owner. The generated CDB is then sent to the encryption device as indicated in step (308), and described in greater detail in ACHIEVING STRONG CORRELATION BETWEEN HIGHER LEVEL SEMANTIC UNITS AND LOWER LEVEL COMPONENTS IN A DATA STORAGE SYSTEM. If the requestor is identified as other, e.g., admin, in step (300), then the nature of the access request is determined in step (302). If the access is determined to be an attempted Write operation then the access is denied as shown in step (304). If the access is determined to be an attempted Read operation then a special CDB such as that illustrated in FIG. 5 is formulated as shown in step (310), and sent to the encryption device in step (308). A special code (500) in the OP Code field is used to instruct the encryption device to refrain from decrypting the data. Consequently, the data is delivered to the file server in encrypted form. New Writes, i.e., Writes to a new file, are by definition by owner. Overwrites, i.e., Writes to an existing file, are not permitted by others and are rejected in the file server itself when adhering to the strict ownership model. Deletes are handled in the file server, without the need for messages to the storage or encryption devices.

In one embodiment the metadata describing the data is delivered to other in-the-clear. Encrypting metadata causes complications which are generally known. Further, permitting admin access to metadata is generally less risky with regard to confidentiality than permitting access to the data itself, and enhances the ability of the admin to perform legitimate management tasks. Because operations such as Read by other may deliver encrypted data and metadata in-the-clear, it may be desirable to separately process data and metadata. Data/metadata separation can be accomplished by creating separate block ranges for the metadata and designating them as "not confidential," and thereby avoiding encryption. It is possible in this manner to obviate the need for a separate LUN for metadata. However, this technique is effective only if the metadata block ranges are separate from the data ranges and each relatively contiguous. If the server already uses a separate LUN for metadata then leaving metadata in clear text is simply a matter of not encrypting the metadata LUNs.

Since occasions may arise where it is actually desirable for someone other than the owner to obtain access to the data in-the-clear, provision may be made to enable decryption by other in extraordinary circumstances. This authority might be withheld from system administrators and even storage administrators, and reserved for an information security specialist or other designated individual. This enhancement could be implemented by changing ownership of a file. It can also be done by building in a group-level Read permission, where the only members of this elite group would be the security specialists. System administrators and other super-users would not be allowed into this group, and would not be allowed to "su" to become members of this group.

In another alternative embodiment access control is extended to controlling access to content based on the location of the content and on the time of access. Location-based controls might be as strict as within a single building, or even a part of a building. They could be broader, possibly to support off-shore development, or even country-specific licensing. Time-based controls could be used to impose time-limited access to executables, or to time-sensitive information. They could also be used at very fine granularity to limit exposure risks. A specific client could be granted access to specific information in a possibly very small window. Dynamically generated information could be a good candidate for this kind of control. Complying with file protocols means that Reads, Writes and Executes would be as before, but the contents of the files, if limited by these other factors, would remain encrypted.

In another alternative embodiment the architecture supports a multi-path file system. This embodiment separates data access from metadata access in order to offload the file server from the bulk of the I/O load. Clients equipped with the proper agent software and FC hardware are able to read and write data directly from and to the storage device. They can do this because they have received "permission" to do so from the actual file server. Included in the "permission" is a map of the blocks relating to the file and the I/O range in particular. This is the kind of information needed to empower the encryption device to compartmentalize the encrypted data in the storage it presents.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Data storage apparatus available to at least one requestor via a network, comprising:
 a file server capable of communication with at least one client via the network;

physical storage comprising one or more logical unit numbers (LUNs) storing data and metadata; wherein the metadata is stored unencrypted and the data is stored encrypted on the one or more LUNs; and an encryption device enabled to selectively decrypt data stored on the one or more LUNs; wherein the encryption device is in communication with both the file server and the one or more LUNs; wherein first and second logical paths are established between the file server and the encryption device without direct communication between the encryption device and the at least one client, the first path being employed for a first type of requestor and the second path being employed for a second type of requestor, and wherein the encryption device is enabled to provide decrypted data and metadata to the file server via the first path, and to provide encrypted data and unencrypted metadata to the file server via the second path;

wherein the first and second logical paths are established between the file server and the one or more LUNs by way of the encryption device, the first requestor having write access to the data, wherein the first requestor is an owner of the data being provided and the second requester does not have write access to the data, wherein the second requestor is other than an owner of the data being provided.

2. The apparatus of claim 1 wherein the file server is operative to identify whether the requestor is first type or second type.

3. The apparatus of claim 1 wherein the second type of requestor is an administrator.

4. The apparatus of claim 2 wherein the file server signals to the encryption device to designate which of the first and second paths to utilize.

5. The apparatus of claim 1 wherein the file server is operative to permit Write operations via the first path, and to deny attempted Write operations via the second path.

6. The apparatus of claim 4 wherein the file server is operative to signal to the encryption device with a SCSI command description block, and to designate the appropriate path with an OP Code in the command description block.

7. The apparatus of claim 1 further comprising a key server wherein the key server is in communication with the encryption device.

8. The apparatus of claim 1 wherein the file server is further operative to prohibit super user privilege via remote access.

9. The apparatus of claim 1 wherein the file server is operative to prompt delivery of decrypted data in extraordinary circumstances.

10. The apparatus of claim 1 wherein the file server is further operative to control access to data based on location of the data and time of day of attempted access.

11. The apparatus of claim 1 wherein the file server is operative to permit a selected requestor to read and write data directly from and to the storage system, where the storage system includes the encryption device and any presented physical storage.

12. The apparatus of claim 11 wherein the file server is operative to provide the selected requestor with a map of blocks relating to a data file in storage.

13. A method for managing data storage available to at least one requestor via a network, physical storage comprising one or more logical unit numbers (LUNs) communicatively coupled to an encryption device, and a file server communicatively coupled to the encryption device, comprising the steps of:

in response to a request from a first type of requestor, wherein the first type of requestor is an owner of data being provided, providing decrypted data to the requestor via a first logical path; wherein the first logical path is established between the file server and the one or more LUNs by way of the encryption device without the requestor being in direct communication with the encryption device; wherein the encryption device is enabled to selectively decrypt data being delivered from the one or more LUNs; and in response to a request from a second type of requestor, wherein the second type of requestor is other than an owner of the data being provided, providing encrypted data and unencrypted metadata to the requestor via a second logical path wherein the metadata is stored unencrypted on the one or more LUNs, wherein the second logical path is established between the file server and the one or more LUNs without the encryption device being in direct communication with the second requestor.

14. The method of claim 13 including a file server, and including the further step of the file server identifying whether the requestor is first type or second type.

15. The method of claim 13 wherein the second type of requestor is an administrator.

16. The method of claim 13 including the further step of the file server signaling to an encryption device logically disposed between the file server and storage, the signaling designating which of the first and second paths to utilize.

17. The method of claim 13 including the further step of the file server permitting Write operations via the first path, and denying attempted Write operations via the second path.

18. The method of claim 16 including the further step of the file server signaling to the encryption device with a SCSI command description block, and designating the appropriate path with an OP Code in the command description block.

19. The method of claim 13 wherein a key server is in communication with the encryption device and wherein the encryption device is enabled to use encryption keys from the key server to selectively decrypt the encrypted data on the one or more LUNs.

20. The method of claim 13 including a file server, and the further step of the file server prohibiting super user privilege via remote access.

21. The method of claim 13 including a file server, and the further step of the file server prompting delivery of decrypted data in extraordinary circumstances.

22. The method of claim 13 including a file server, and the further step of the file server controlling access to data based on location of the data and time of day of attempted access.

23. The method of claim 13 including a file server, and the further step of the file server permitting a selected requestor to read and write data directly from and to a logical storage device.

24. The method of claim 23 including a file server, and the further step of the file server providing the selected requestor with a map of blocks relating to a data file in the logical storage device.

25. A computer program product for managing data storage available to at least one requestor via a network, physical storage comprising one or more logical unit numbers (LUNs) communicatively coupled to an encryption device, and a file server communicatively coupled to the encryption device, the program product-comprising:

a non-transitory computer readable medium encoded with computer executable program code, wherein the code enables a processor to execute:

in response to a request from a first type of requestor, wherein the first type of requestor is an owner of data being provided, providing decrypted data to the requestor via a first logical path; wherein the first logical path is established between the file server and the one or more LUNs by way of the encryption device without the requestor being in direct communication with the encryption device; wherein the encryption device is enabled to selectively decrypt data being delivered from the one or more LUNs; and in response to a request from a second type of requestor, wherein the second type of requestor is other than an owner of the data being provided, providing encrypted data and unencrypted metadata to the requestor via a second logical path wherein the metadata is stored unencrypted on the one or more LUNs, wherein the second logical path is established between the file server and the one or more LUNs without the encryption device being in direct communication with the second requestor.

26. The computer program product of claim 25 wherein a key server is in communication with the encryption device and wherein the encryption device is enabled to use encryption keys from the key server to selectively decrypt the encrypted data on the one or more LUNs.

* * * * *